United States Patent [19]
Loisch et al.

[11] Patent Number: 5,212,672
[45] Date of Patent: May 18, 1993

[54] TIMING CONTROL APPARATUS

[76] Inventors: Julius A. Loisch, 155 Graywood Ave., Elkhart, Ind. 46516; Rod Snider, 25037 Timberlake Dr., Tega Cay, S.C. 29715; John W. Harriger, 54541 Meadowbank La., Elkhart, Ind. 46514

[21] Appl. No.: 794,916

[22] Filed: Nov. 20, 1991

[51] Int. Cl.5 .................. G04B 19/00; G04C 21/00; G04C 21/16
[52] U.S. Cl. ................................ 368/79; 368/250; 368/256
[58] Field of Search ............... 368/79, 67, 68, 239, 368/250, 256; 362/260, 373, 801

[56] References Cited

U.S. PATENT DOCUMENTS

| | | | |
|---|---|---|---|
| 3,727,395 | 4/1973 | Baylor | 368/79 |
| 3,798,889 | 3/1974 | Chadwick | 368/79 |
| 4,028,882 | 6/1977 | Muncheryan | 368/12 |
| 4,093,944 | 6/1978 | Muncheryan | 368/12 |
| 5,008,865 | 4/1991 | Shaffer et al. | 368/10 |
| 5,079,682 | 1/1992 | Roberts | 362/276 |

Primary Examiner—Vit W. Miska
Attorney, Agent, or Firm—Rodger H. Flagg

[57] ABSTRACT

A timing control apparatus for selectively actuating at least one remote device, such as a variable intensity lamp, an audio device or an aroma generator at a selected future time, by generating a plurality of clock pulses of a known time duration at the selected time, and by counting the clock pulses to gradually increase the intensity of electrical current in response to the clock pulses counted, from an initial zero state to full intensity over time, such as one hour. The gradual increase in intensity provides a gradual increase in the light, sound or smell from selected remote devices, to gently awaken a user, without an abrupt on/off actuation found in alarm clocks, and other similar devices.

20 Claims, 3 Drawing Sheets

TIMING CONTROL APPARATUS

BACKGROUND OF THE INVENTION

The chemistry of the human body is responsive to an internal clock, which is independent of the timing of external conditions. Thus, when travelers fly over several time zones, their internal clock is upset by the change in environmental conditions, and they often experience difficulty in adjusting to the changing environmental conditions.

Their internal clock is out of sync with external environmental conditions, such as daylight and darkness. This difficulty in adjusting to changing environmental conditions is also present during seasonal changes in the environment.

In the Summer, the sun usually rises between 5:00 and 5:30 A.M. in North America. At dawn, the light intensity increases very gradually, gently arousing a sleeper in a restful manner.

In Winter, the sun usually rises between 7:00 and 7:30 A.M. in North America, and many people must awaken in the darkness, and transition from darkness to light is abrupt when a light is turned on. It has been observed that awaking in the summer months in response to the gradual increase in light from the sun leaves the human body and mind much more alert and with an overall good feeling. Quite the opposite effect occurs in the Winter months.

In addition to the effect of light on wakefulness, there is also a positive effect on one's mental state in the presence of a pleasant background sound, such as ocean waves or soft music. A positive effect is also generated by a pleasing aroma, such as the aroma of brewing coffee or freshly baked food.

Attempts have been made to provide artificial sunrise effects by mechanical or electro-mechanical devices. Several such devices are disclosed in U.S. Pat. Nos. 4,379,232, 4,038,561 and 3,727,395.

Alarm clock devices are well known in the art, which actuate an audio device, such as a clock radio or buzzer. Such devices are actuated from an "off" to an "on" condition, causing an abrupt change in the sleeping environment. While most clock radios are equipped with a volume control, the sound is not gradually increased over time as disclosed herein. Rather, the sound level is preset, and the audio device is actuated to the preset volume abruptly as the device is turned on.

SUMMARY OF THE INVENTION

This invention relates to improvements in timing control apparatus adapted to sequentially control at least one device, such as a source of illumination, a source of background sound, and/or an aroma generator, wherein the timing control apparatus is adapted to actuate a selected circuit as well as modify the intensity of the selected circuit over a controlled time sequence on a pre-programed basis.

A clock divider divides the incoming waveform from a power source, such as A.C. house current, to provide a controlled output pulse. The controlled output pulse is counted and the output resistance is decreased in proportion with the increasing count of pulses from the clock divider, to increase the intensity of a selected device, such as a source of illumination.

The source of illumination increases in intensity over time from an off condition to a fully illuminated condition. The timing control apparatus may also control other devices, such as an audio device, which respond to the decreasing output resistance by increasing the intensity of sound over time from an off condition to a controlled volume condition.

The audio device may be in the form of a buzzer, or radio, or cassette player, or other known audio devices. Other devices, such as an aroma generator may also be selectively actuated, and increased in intensity over time from an off condition to a controlled aroma generating intensity, or may be adapted for preprogrammed off/on control, to suit the needs of the user.

The timing control apparatus preferably actuates more than one device, such as a source of illumination, an audio source and an aroma generator, at different selected times, dependent upon the output resistance generated by the clock divider.

Thus, the illumination apparatus may be actuated from an off condition at a designated time, to a fully illuminated condition over time, such as an hour. The audio device may be actuated at a later time, and increase in volume over a selected time, such as several minutes.

An aroma generator may also be selectively actuated at a time different from the actuation of the illumination circuit, so that all three devices aid in gently waking a sleeper as the devices are selectively actuated and increased in intensity over time. In combination, these gradual adjustments in the waking environment provide a positive transition from sleep to wakefulness, regardless of the season.

The above mentioned and other features and objects of the invention, and the manner of attaining them will be best understood by reference to the following description of an embodiment of the invention, when considered in conjunction with the accompanying drawings:

BEST MORE FOR CARRYING OUT THE INVENTION

Figure 1:
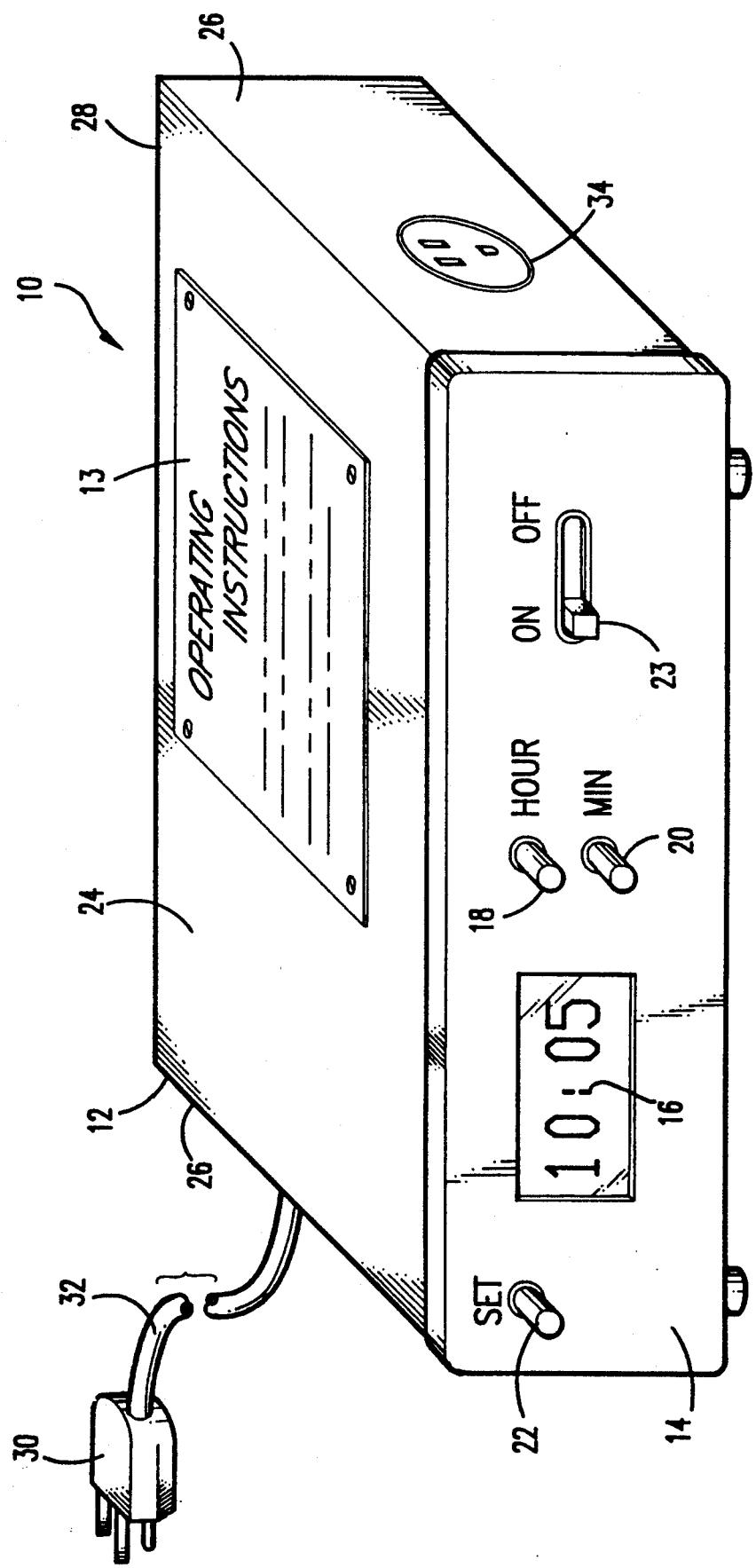
FIG. 1 is a perspective view of a timing control apparatus having at least one time controlled, variable intensity output socket.

The subject matter which we regard as our invention is particularly pointed out and distinctly claimed in the claims. The structure and operation of our invention together with further objects and advantages, may be better understood from the following description given in connection with the accompanying drawings, in which:

FIG. 1 shows a perspective view of the timing control apparatus 10 housing 12, having a front panel 14, with a visual display 16, indicating the time. An hour control 18, minute control 20, and set control 22 are also preferably displayed at a suitable location on the front panel 14. Alternately, the visual display 16 and/or the hour control 18, the minute control 20, the set control 22 may be located at a suitable location on the top 24, on one of the sides 26 or rear 28 of the housing 12, to suit manufacturing preference.

An electric plug 30 suitable for engagement with a remote household A.C. socket (not shown) may be connected by an electric cord 32 to the timing control apparatus 10 to supply an electric current thereto. Alternately, a portable source of power, such as batteries (not shown), may be used to actuate the timing control apparatus.

One or more electric sockets 34 may be located on one of the sides 26, or the top 24, or rear 28, or on the front 14 of the timing control apparatus 10, to suit manufacturing preference.

A suitable electric apparatus (not shown) such as a variable intensity incandescent lamp 50, preferably in the range of 40 to 100 Watts, an audio device 38 and/or an aroma generator 39 may be plugged into a selected electric socket 34 on the timing control apparatus 10. Socket 34A may be used for lamp 50, socket 34B may be used for the audio device 38, and socket 34C may be used for the aroma generator 39. The timing control apparatus 10 is plugged into a remote power source (not shown), such as an A.C. line circuit having a socket for receiving a plug 30 attached to a power cord 32.

Figure 2:
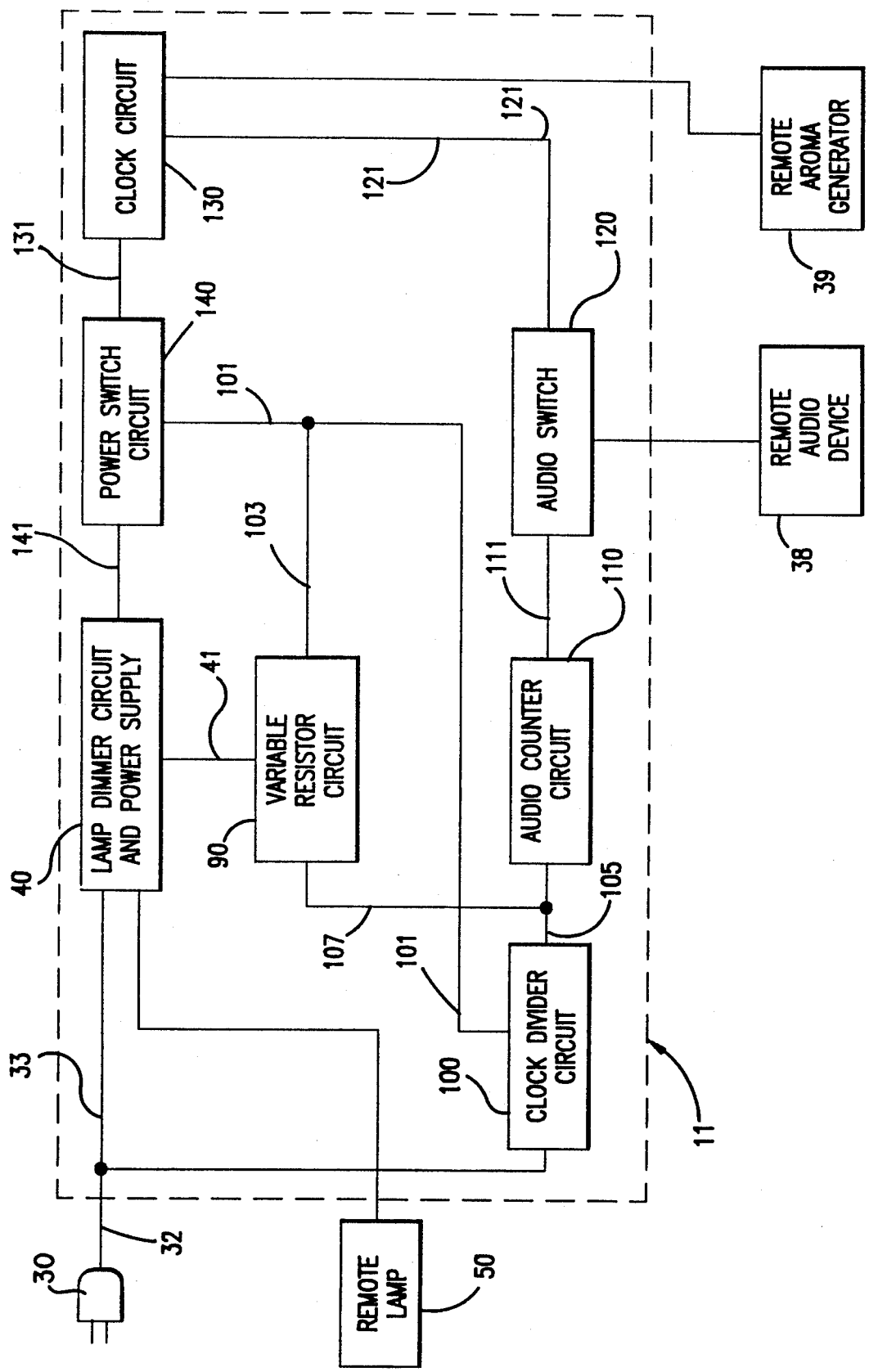
FIG. 2 is a block diagram of the timing control device, showing in combination a light intensity control and an audio intensity control device.

Referring now to FIG. 2, a block diagram of the timing control circuit 11 discloses the power plug 30 adapted for connection to a power supply, such as a 120 V.A.C. power supply, a 12 volt power supply, or other suitable power supplies known in the art. An electric cord 32 comprises wires 33, 35. A lamp dimmer circuit and power supply are shown as block 40. Lamp dimmer circuit shown in FIG. 3 comprises transistor 52, such as SCR 2N2323; transistor 56, such as 2N4870; transistor 60, such as 2N3638; and transistor 68. The lamp dimmer circuit 40 also includes resistor 54, preferably 100 Ohm; resistor 58, preferably 1120 Ohm; resistor 62, preferably 6.8 KOhm; resistor 64, preferably 47 KOhm; resistor 66, preferably 10 KOhm; resistor 72, preferably 100 KOhm; and resistor 74, preferably 1 MOhm. The lamp dimmer circuit 40 also includes capacitor 78, preferably 100 uF.

The part numbers, resistance and capacitance values disclosed herein are intended to be representative of the preferred embodiment. Other part numbers, resistance and capacitance values may be used by one skilled in the art to produce similar results. Where other part numbers, resistance and capacitance values are used to produce similar results, they are intended to be included within the scope of the following claims.

Line 41 in FIG. 2 connects lamp dimmer circuit 40 with an electronic variable resistor circuit 90. The lamp dimmer circuit is also connected by line 141 to electronic power switch 140. The electronic power switch 140 is connected by line 101 to a clock divider 100 and to an audio counter 110 by line 109 which is connected to line 101. Line 103 connects electronic variable resistor circuit 90 by line 103 to line 101. Line 105 connects the clock divider 100 to the audio counter 110, and to line 107 which connects to the electronic variable resistor circuit 90.

Line 111 connects the audio counter 110 to the audio switch 120. The audio switch 120 is connected by line 121 to the clock circuit 130. The clock circuit is also connected by line 131 to the electronic power switch 140.

Figure 3:
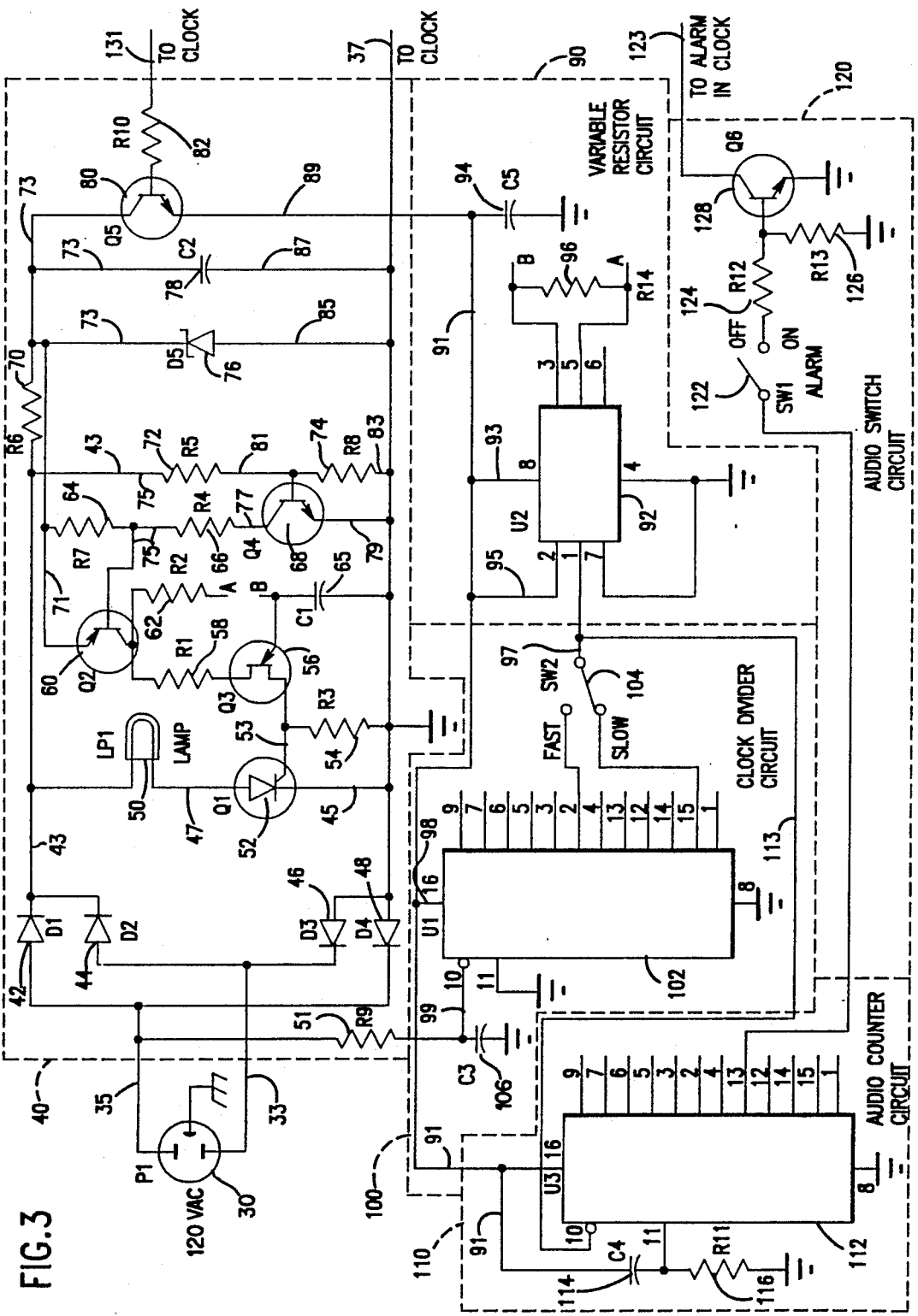
FIG. 3 is a schematic drawing of the preferred timing control circuit.

Referring now to FIG. 2 and 3, plug 30 is connected to a socket connected to a remote power supply (not shown). Lines 33, 35 extend from plug 30, for connection within lamp dimmer and power supply circuit 40. The incoming power supply is rectified by diodes 42, 44, 46, 48. These diodes are preferably IN 2071, which supply rectified line voltage for the lamp dimming circuitry 40.

Line 35 connects to the back of diode (D1) 42 and to the front of diode (D4) 48. Line 33 connects to the back of diode (D2) 44 and to the front of diode (D3) 46. The front of diodes 42 and 44 connect to one side of lamp (LP1) 50 over line 43. Line 43 also connects to resistor (R6) 70, preferably 3 KOhm, and to resistor (R5) 72. Line 35 is also connected by line 39 to resistor (R9) 51.

The back sides of diodes 46, 48 connect to power common 37, which extends to the clock circuit 130. The other side of lamp 50 connects by line 47 to the base of transistor (Q1) 52. Transistor 52 connects by line 45 to power common 37. Transistor 52 also connects to transistor (Q3) 56 over line 53 and to resistor (R3) 54.

The other end of resistor 54 connects to power common 37 via line 55. Transistor 56 is connected by line 57 to resistor (R1) 58. The other end of resistor 58 is connected by line 59 to the collector of transistor (Q2) 60, and to resistor (R2) 62. The other end of resistor R2 is connected to "A". The base of transistor 56 is connected by line 61 to the positive side of capacitor (C1) 65 and to "B". The negative side of capacitor 65 is connected by line 63 to power common 37.

The emitter of transistor 60 is connected by line 71 to resistor (R7) 64 and to line 73. Line 73 connects to the other end of resistor 70 and to zener diode (D5) 76, preferably IN4732. Line 73 is also connected to the positive side of capacitor (C2) 78 and to the collector of transistor (Q5) 80, preferably MPS 6531.

Resistor 70, zener diode 76 and capacitor 78 supply filtered and regulated 5 volts DC. When the alarm in the clock circuit 140 is tripped, power transistor 80 is turned on via resistor 82, preferably 39 KOhm. The power switch 140 turns on 5 volt DC power for the clock divider 100, the electronic variable resistor circuit 90, and the audio counter 110.

The opposite side of resistor 64 is connected by line 75 to resistor (R4) 66 and to the base of transistor 60. The opposite end of resistor 66 is connected by line 77 to the collector of Transistor (Q4) 68. Transistor 68 preferably is a 6531 transistor. The emmitter of transistor 68 is connected to power common by line 79.

The other side of resistor 72 is connected by line 81 to resistor 74 and to the base of transistor 68. The opposite side of resistor 74 is connected by line 83 to power common 37. The other side of zener diode 76 is connected by line 85 to power common 37. The negative side of capacitor 78 is connected by line 87 to power common 37.

The emitter of transistor 80 is connected by line 89 t the positive side of capacitor (C5) 94, preferably 100 uF. The negative side of capacitor 94 is connected to power common 37. The base of transistor 80 is connected to resistor 82. The opposite side of resistor 82 is connected by line 131 to the clock circuit portion of the alarm output.

Line 91 connects line 89 with the electronic variable resistor circuit 90 and with the clock divider circuit 100. Integrated circuit (U2) is connected to line 91 by line 93 at pin 8. (Hereafter I.C. will be used in place of Integrated circuit.) Line 95 connects pin 2 of I.C. 92 to line 91. I.C. 92 is preferably an IC X9104 or Xicor X9MME. Pin 3 of I.C. 92 connects to one side of resistor 96 and to "B". Resistor 96 is preferably 150 KOhm. Pin 5 of I.C. 92 connects to the other side of resistor 96 and to "A". Pins 4 and 7 of I.C. 92 are connected to power common 37. Pin 1 of I.C. 92 is connected by line 97 to switch 104 located in clock divider circuit 100.

I.C. 102, which is preferably a clock driver 4040, is connected at pin 16 by line 98 to line 91. Pin 10 of I.C. 102 is connected by line 99 to the other side of resistor 51, which is preferably 1 Meg Ohm, and to the positive side of capacitor 106, which is preferably 0.001 uF. The negative side of capacitor 106 is connected to power common 37. Pin 11 of I.C. 102 is also connected to power common 37.

Pin 2 of I.C. 102 is connected to the normally open portion of switch 104, and pin 15 is connected to the normally closed portion of switch 104. Switch 104 is preferably a SPDT switch.

Line 113 connects line 97 to pin 10 of I.C. 112, which is preferably clock driver 4040. Pin 16 of I.C. 112 is connected to line 91 and to the positive side of capacitor (C4) 114, which is preferably 0.1 uF. The negative side of capacitor 114 is connected to pin 11 of I.C. 112 and to resistor (R11) 116, which is preferably 100 KOhm. The opposite side of resistor 116 is connected to power common 37. Pin 8 of I.C. 112 is also connected to power common 37. Pin 13 of I.C. 112 is connected to switch (S1) 122. Switch 122 is preferably a SPST switch.

The "ON" connection of switch 122 is connected to resistor (R12) 124. Resister 124 is preferably a 39 KOhm resistor. The opposite side of resistor 124 is connected to the base of transistor 128 and to resistor (R13) 126. Transistor 128 is preferably a MPS 6531 transistor. Resistor 126 is preferably a 10 KOhm resistor. The opposite side of resistor R13 and the emitter of transistor 128 are connected to power common 37. The collector of transistor 128 is connected by line 123 to the alarm signal in an alarm clock (not shown).

The clock divider circuit 100 divides the incoming A.C. waveform into 1000 to 3000 timed pulses, to provide an output timing pulse every 20 to 40 seconds. Preferably, the incoming A.C. waveform is 60 Hz, and the incoming 60 hz A.C. waveform is divided into 2048 timed pulses, which provides an output pulse every 34.13 seconds. The variable resistor circuit 90 counts the output pulses from I.C. 102, decreasing its output resistance in proportion with the increasing count of pulses it receives from I.C. 102.

The variable resistor circuit 90 starts with a very high resistance, such as 100K Ohms at zero count, and progresses to a very low resistance, near zero Ohms at a selected terminal count, such as 50 to 150 pulses. Preferably the selected terminal count is 100 pulses. After reaching its terminal count, additional pulses on the input of I.C. 92 produce no further change in the output resistance of I.C. 92.

The output of I.C. 92 goes to the light dimmer circuit 40, where the time constant of the phase shift circuit is controlled. The phase shift circuit comprises resistor 62 at "A", the output of I.C. 92 at "A" and "B", and capacitor 65 at "B". The phase shift circuit effects control over the light dimming circuit 40.

As the resistance of I.C. 92 goes down, the phase shift produced by resistor 62 at "A", capacitor 65 at "B" and I.C. 92 at "A" and "B" decreases and the power supplied to the lamp through transistor 52 increases, causing the lamp to get brighter.

The total time required for I.C. 92 to go from zero count (minimum lamp brightness) to a set number of output pulses (maximum lamp brightness) is preferably selected from 50 to 150 pulses. The number of output pulses is determined by the rate of pulses it receives from I.C. 102. Preferably the set number of output pulses is 100, received every 34.13 seconds. Preferably, the lamp takes 3413 seconds, or 56.88 minutes, to reach maximum brightness.

The Audio counter circuit 110, I.C. 112 also counts the pulses coming from the clock divider I.C. 102. When I.C. 112 accumulates a set number of clock divider pulses preferably selected from 50 to 150 clock divider pulses, it actuates an audio switch transistor 128 via resistors 124 and 126, switching on the audio switch 120 which actuates an alarm clock or other audio device 38. Preferably, 128 pulses are received, which takes 73 minutes (128 pulses times 34 seconds per pulse) causing the audio device 38 to approximately coincide with the lamp 50, as the lamp 50 achieves full brightness.

Alternately, the audio device 38 may be controlled in a manner disclosed above for increasing the intensity of the light 50, to increase the audio sound over time until the sound reaches the level selected at the audio device 38.

Turning off the alarm output of the clock circuit turns off transistor switch 80 of electronic power switch 140. This removes power from the clock divider circuit 100, the electronic variable resistor 90, and the audio counter 110, which turns off the lamp 50 and the audio alarm controlled by audio switch 120.

In operation, the timing control apparatus 10 is placed in proximity to a remote power supply socket, and plug 30 is inserted into the remote power supply socket to provide 120 VAC power to the timing control circuit 11. The time, preferably in hours and minutes, appears on the visual display 16.

Controls 18, 20 and 22 allow the user to select the current time, and to select the desired time for the control timing circuit to be actuated, in a manner well known in the art, and disclosed in conventional alarm clock circuitry. The actuation of the control timing circuit 10 may be set for the beginning of the count cycle as described above, or may be designed to be set at the time of achieving full intensity of the device being controlled, or at any time in between, to suit the manufacturer's design parameters.

The control timing apparatus 10 may provide a variable time control (not shown) which enables the user to select the time of actuation of other selected devices, such as an audio device 38 or an aroma generator 39.

An on/off switch 23 enables the user to turn the device off or on at any time. At least one electrical socket 34 is provided to receive an electric plug (not shown) from the device to be controlled. Where more than one socket 34 is provided, at least one socket provides a controlled increase in intensity over time, as disclosed above.

Additional sockets 34A, 34B and 34C may be provided to actuate a device from "off" to "on" condition after a controlled time duration wherein other controlled devices have already increased in intensity, as disclosed herein.

Operating instructions 13 may be provided on the timing control apparatus 10 housing 12, for ease of access, or they may be provided on the packaging (not shown), or in a suitable format which is included with the timing control apparatus 10 at the time of sale.

Thus, while the novel timing control apparatus 10 has been fully discloses and described herein, numerous modifications and adaptations will become readily apparent to one of ordinary skill in this art, and such adaptations and modifications are intended to be included within the scope of the following claims.

I claim:

1. A timing control apparatus comprising:
   a) a clock divider circuit for dividing an incoming source of electrical power into a plurality of timed pulses;
   b) a variable resistor circuit for counting the output pulses from the clock divider circuit, and for decreasing the output resistance in proportion with the increasing count of pulses it receives from the clock divider circuit; and
   c) a light dimmer circuit responsive to the output resistance of the variable resistor circuit for actuating a remote lamp source at an initial low light level, and for controllably increasing the intensity of the remote lamp source to a high light level over time in response to the decreasing output resistance from the variable resistor circuit.

2. The timing control apparatus of claim 1, wherein the clock divider circuit divides the incoming source of A.C. waveform electrical power into 1000 to 3000 timed pulses.

3. The timing control apparatus of claim 1, wherein the timing pulses provide an output pulse every 20 to 40 seconds.

4. The timing control apparatus of claim 1, wherein the clock divider circuit uses an integrated circuit to divide the incoming source of electrical power into a plurality of timed pulses, and the variable resistance circuit uses an integrated circuit to count the output pulses received from the clock divider circuit.

5. The timing control apparatus of claim 1, wherein an audio counter circuit counts the output pulses from the clock divider circuit, to accumulate a set number of output pulses, and to actuate a remote audio device upon receipt of the set number of output pulses from the clock divider circuit.

6. The timing control apparatus of claim 5, wherein the remote audio device is actuated at a pre-set low volume level, and the volume of the remote audio device increases over time to a preset high volume level.

7. The timing control apparatus of claim 5, wherein the remote audio source is actuated at a pre-determined time after the initial actuation of the remote lamp source.

8. The timing control apparatus of claim 5, wherein the set number of output pulses is 50 to 150.

9. The timing control apparatus of claim 1, wherein an electronic power switch turns off power to the clock divider circuit and to the variable resistor circuit, to turn off a remote device.

10. The timing control apparatus of claim 5, wherein an electronic power switch turns off power to the clock divider circuit, the variable resistor circuit and the clock divider circuit to turn off the remote lamp and a remote alarm clock.

11. A timing control apparatus comprising:
    a) a clock divider circuit for dividing an incoming source of electrical power into a plurality of timed pulses;
    b) a variable resistor circuit for counting the output pulses from the clock divider circuit, and for decreasing the output resistance in proportion with the increasing count of pulses it receives from the clock divider circuit;
    c) a light dimmer circuit for controlling an increase in intensity of a remote lamp source over time in response to the decreasing output resistance from the variable resistor circuit;
    d) an audio counter circuit for counting the output pulses from the clock divider circuit, to accumulate a set number of output pulses, and upon receipt of the set number of output pulses, a remote audio device is actuated.

12. The timing control apparatus of claim 11, wherein the clock divider circuit divides the incoming source of A.C. waveform electrical power into 1000 to 3000 timed pulses.

13. The timing control apparatus of claim 11, wherein the timing pulses provide an output pulse every 20 to 40 seconds.

14. The timing control apparatus of claim 11, wherein the clock divider circuit uses an integrated circuit to divide the incoming source of electrical power into a plurality of timed pulses, and the clock divider circuit uses an integrated circuit to count the timed pulses received from the clock divider circuit.

15. The timing control apparatus of claim 11, wherein the remote audio device is actuated at a pre-set low volume level, and the volume of the remote audio device increases over time to a preset high volume level.

16. The timing control apparatus of claim 11, wherein the remote audio source is actuated at a pre-determined time after the initial actuation of the remote lamp source.

17. A timing control apparatus, which comprises:
    a) a clock divider circuit for dividing an incoming source of electrical power into a plurality of timed pulses selected from 1000 to 3000 pulses;
    b) a variable resistor circuit for counting the output pulses from the clock divider circuit, and for decreasing the output resistance in proportion with the increasing count of pulses it receives from the clock divider circuit;
    c) a light dimmer circuit for controlling an increase in intensity of a remote lamp source over time in response to the decreasing output resistance from the variable resistor circuit;
    d) an audio counter circuit for counting the output pulses from the clock divider circuit, and for accumulating a set number of output pulses, and upon receipt of the set number of output pulses, for actuating a remote audio device;
    e) a first electrical socket for for receiving a plug from a remote illumination device, for controlling the actuation of the remote illumination device;
    f) a second electrical socket for receiving a plug from a remote audio device for controlling the actuation of the remote audio device.

18. The timing control apparatus of claim 17, wherein a third electrical socket is provided for receiving a plug from a aroma generating device.

19. The timing control apparatus of claim 17, wherein the incoming A.C. waveform is 60 Hz. and the clock divider circuit divides the incoming waveform into 2048 pulses.

20. The timing control apparatus of claim 17, wherein the timing pulses provide an output pulse every 34.13 seconds.

* * * * *